US011689546B2

(12) United States Patent
Rivlin

(10) Patent No.: US 11,689,546 B2
(45) Date of Patent: Jun. 27, 2023

(54) IMPROVING NETWORK SECURITY THROUGH REAL-TIME ANALYSIS OF CHARACTER SIMILARITIES

(71) Applicant: CyberArk Software Ltd., Petach-Tikva (IL)

(72) Inventor: Ofer Rivlin, Petach-Tikva (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 17/487,319

(22) Filed: Sep. 28, 2021

(65) Prior Publication Data
US 2023/0098812 A1 Mar. 30, 2023

(51) Int. Cl.
*H04L 9/40* (2022.01)

(52) U.S. Cl.
CPC ...... *H04L 63/1416* (2013.01); *H04L 63/0236* (2013.01); *H04L 63/145* (2013.01); *H04L 63/1425* (2013.01); *H04L 63/20* (2013.01)

(58) Field of Classification Search
CPC . H04L 63/14; H04L 63/1408; H04L 63/1416; H04L 63/1425; H04L 63/1441; H04L 63/1483; H04L 63/20; H04L 63/02; H04L 63/0227; H04L 63/0236
See application file for complete search history.

(56) References Cited

U.S. PATENT DOCUMENTS

| | | | | |
|---|---|---|---|---|
| 9,311,423 | B1 * | 4/2016 | Brown | G06F 16/285 |
| 9,979,748 | B2 * | 5/2018 | O'Connor | H04L 63/145 |
| 10,397,272 | B1 * | 8/2019 | Bruss | G06F 18/214 |
| 10,496,752 | B1 * | 12/2019 | Crossley | G06F 40/295 |
| 10,496,924 | B1 * | 12/2019 | Highnam | G06N 3/082 |
| 10,609,072 | B1 * | 3/2020 | Weldon | H04L 67/02 |
| 10,673,814 | B1 * | 6/2020 | Huffner | H04L 61/3025 |
| 10,742,591 | B2 * | 8/2020 | Nguyen | H04L 63/1408 |
| 10,862,907 | B1 * | 12/2020 | Pon | G06F 16/955 |
| 10,911,477 | B1 * | 2/2021 | Kharraz | G06F 16/90344 |
| 10,924,503 | B1 * | 2/2021 | Pereira | H04L 63/20 |
| 10,965,697 | B2 * | 3/2021 | Manadhata | G06F 40/284 |
| 11,016,997 | B1 * | 5/2021 | Huang | G06F 16/285 |
| 11,108,794 | B2 * | 8/2021 | Manadhata | H04L 61/3025 |
| 11,245,720 | B2 * | 2/2022 | Manadhata | H04L 63/10 |
| 11,258,814 | B2 * | 2/2022 | Janakiraman | H04L 43/045 |
| 2006/0080437 | A1 * | 4/2006 | Lake | H04L 63/101 707/E17.115 |
| 2009/0043721 | A1 * | 2/2009 | Reznik | G06F 16/9566 706/20 |
| 2014/0115704 | A1 * | 4/2014 | Miller | H04L 63/1416 726/23 |

(Continued)

*Primary Examiner* — Khang Do
(74) *Attorney, Agent, or Firm* — Finnegan, Henderson, Farabow, Garrett & Dunner LLP

(57) ABSTRACT

Disclosed embodiments relate to improving network security through real-time analysis of character similarities. Techniques include identifying a reference name, identifying a domain name, and performing a real-time analysis of the domain name. The real-time analysis may include applying a language processing protocol to the domain name, generating a score indicating a similarity between the domain name and the reference name, accessing a similarity threshold, and comparing the generated score with the similarity threshold. Further techniques include determining that the score exceeds the threshold and performing a security action.

18 Claims, 7 Drawing Sheets

(56) References Cited

U.S. PATENT DOCUMENTS

| | | | |
|---|---|---|---|
| 2016/0065534 A1* | 3/2016 | Liu | G06F 16/287 707/728 |
| 2016/0344770 A1* | 11/2016 | Verma | H04L 51/42 |
| 2016/0352772 A1* | 12/2016 | O'Connor | H04L 63/1483 |
| 2017/0295134 A1* | 10/2017 | Isenberg | H04L 63/1425 |
| 2018/0007090 A1* | 1/2018 | Cao | H04L 63/101 |
| 2018/0139235 A1* | 5/2018 | Desai | H04L 63/1483 |
| 2018/0375896 A1* | 12/2018 | Wang | G06F 16/9535 |
| 2019/0068638 A1* | 2/2019 | Bartik | H04L 63/1483 |
| 2019/0138652 A1* | 5/2019 | Miranda | G06F 16/3347 |
| 2019/0222589 A1* | 7/2019 | Kislitsin | H04L 63/1416 |
| 2019/0387024 A1* | 12/2019 | Schulman | H04L 63/0236 |
| 2020/0034741 A1* | 1/2020 | Jagmohan | G06F 40/30 |
| 2020/0036751 A1* | 1/2020 | Kohavi | H04L 63/1416 |
| 2020/0053119 A1* | 2/2020 | Schnieders | H04L 63/101 |
| 2020/0059451 A1* | 2/2020 | Huang | G06N 3/02 |
| 2020/0137024 A1* | 4/2020 | Janakiraman | H04L 63/0236 |
| 2020/0213347 A1* | 7/2020 | Kalinin | H04L 63/1433 |
| 2020/0228500 A1* | 7/2020 | Olumofin | H04L 63/1483 |
| 2020/0265261 A1* | 8/2020 | Dalal | G06V 20/635 |
| 2020/0287913 A1* | 9/2020 | Buck | H04L 63/0236 |
| 2020/0304540 A1* | 9/2020 | Chang | H04L 63/1416 |
| 2020/0358798 A1* | 11/2020 | Maylor | H04L 63/1425 |
| 2020/0394497 A1* | 12/2020 | Loyola | G06N 3/0454 |
| 2021/0051174 A1* | 2/2021 | Kitahara | H04L 63/1483 |
| 2021/0097168 A1* | 4/2021 | Patel | H04L 63/1416 |
| 2021/0120035 A1* | 4/2021 | Onut | H04L 63/1483 |
| 2021/0174199 A1* | 6/2021 | Manadhata | G06N 3/0445 |
| 2021/0194888 A1* | 6/2021 | Bhaskar | H04L 63/105 |
| 2021/0211448 A1* | 7/2021 | Taniguchi | H04L 63/1441 |
| 2021/0279497 A1* | 9/2021 | Chiba | G06F 21/552 |
| 2021/0377301 A1* | 12/2021 | Desai | G06F 21/577 |
| 2022/0038424 A1* | 2/2022 | Liu | H04L 63/0236 |
| 2022/0060491 A1* | 2/2022 | Achleitner | H04L 63/1416 |
| 2022/0070216 A1* | 3/2022 | Kohavi | H04L 63/1416 |
| 2022/0078207 A1* | 3/2022 | Chang | G06F 40/194 |
| 2022/0207343 A1* | 6/2022 | Lei | G06N 3/0454 |
| 2022/0303288 A1* | 9/2022 | Wang | H04L 63/1433 |

* cited by examiner

| Domain Name | Reference Name | Score |
| --- | --- | --- |
| cyberpunk.com | cyberark | 0.3 |
| cyberarmy.xyz | cyberark | 0.3 |
| cybrark.com | cyberark | 0.9 |
| cybermark.net | cyberark | 0.9 |
| cybrmonkey.site | cyberark | 0.1 |
| cyberarkai.xyz | cyberark | 1.0 |
| songbard.com | songbird | 0.9 |
| songbirdsales.biz | songbird | 1.0 |
| sangberdz.xyz | songbird | 0.7 |

FIG. 5

IMPROVING NETWORK SECURITY THROUGH REAL-TIME ANALYSIS OF CHARACTER SIMILARITIES

BACKGROUND

Phishing and cybersquatting are tactics used by malicious actors to carry out attacks on computing systems. "Typosquatting," or URL hijacking, is technique in which a malicious actor employs a malicious domain name that is very similar to a legitimate domain name. By taking advantage of users who mistakenly type or otherwise navigate to the malicious domain name (e.g., through a typographical error or by being fooled into clicking a link to the domain in a phishing email), malicious actors can carry out attacks on the user's machine or network. Other malicious actors may send phishing email messages from domains similar to legitimate domains, thus fooling users into believing that the emails are legitimate.

Conventional methods of attack prevention, however, are not conducted in real-time and merely attempt to stop or prevent an already launched attack. Thus, an unsuspecting user may facilitate an attack by clicking on a malicious link because conventional methods do not analyze domains in real-time. As a result, phishing and typosquatting attacks are allowed to proliferate.

Accordingly, in view of these and other deficiencies in existing techniques, technological solutions are needed for real-time analysis of domain names or character strings. Solutions should advantageously permit identification of malicious domains or programs in real-time, for example, before a user navigates to a domain. Solutions should permit a user to be notified that a domain or program is malicious before the user's machine navigates to the domain or executes the program.

SUMMARY

The disclosed embodiments describe non-transitory computer readable media, systems, and methods for improving network security through real-time analysis of character similarities. For example, in an exemplary embodiment, there may be a non-transitory computer readable medium including instructions that, when executed by at least one processor, cause the at least one processor to perform operations for analyzing domain names to detect potential security risks. The operations may include identifying a reference name, identifying a domain name, and performing a real-time analysis of the domain name. The real-time analysis may include applying a language processing protocol to the domain name, the domain name being an input to the application of the language processing protocol, generating, based on the domain name and the application of the language processing protocol, a score indicating a similarity between the domain name and the reference name, accessing a similarity threshold, and comparing the generated score with the similarity threshold. The operations may further include determining, based on the comparison, that the score exceeds the threshold and performing, based on the determination, a security action corresponding to the domain name. The security action may include at least one of: sending an alert indicating the domain name is potentially malicious, displaying a visual notation associated with the domain name, blocking access to the domain name, preventing an email from being sent to an email address associated with the domain name, or preventing an email from being received from an email address associated with the domain name.

According to a disclosed embodiment, the language processing protocol may include a word embedding algorithm.

According to a disclosed embodiment, the word embedding algorithm may be an n-gram language model.

According to a disclosed embodiment, identifying a domain name includes identifying a list having a plurality of domain names.

According to a disclosed embodiment, the domain name may be identified from a list comprising a plurality of newly created domain names.

According to a disclosed embodiment, the domain name may be identified from a website URL.

According to a disclosed embodiment, the domain name may be identified from a link in a website.

According to a disclosed embodiment, the domain name may be identified from a link in an email.

According to a disclosed embodiment, the domain name may be associated with an email address.

According to a disclosed embodiment, the score may be a confidence score indicating a level of variation of the domain name from the reference name.

According to another disclosed embodiment, a method may be implemented for analyzing character elements to detect potential security risks. The method may comprise identifying a reference name, identifying a character element, and performing a real-time analysis of the character element. The analysis may include applying a language processing protocol to the character element, the character element being an input to the application of the language processing protocol, generating, based on the character element and the application of the language processing protocol, a score indicating a similarity between the character element and the reference name, accessing a similarity threshold, and comparing the generated score with the similarity threshold. The method may further include determining, based on the comparison, that the score exceeds the threshold and performing, based on the determination, a security action corresponding to the character element.

According to a disclosed embodiment, the confidence score may be based on a calculated similarity measurement between the character element and the reference name.

According to a disclosed embodiment, the similarity measurement may include a calculated distance between the character element and the reference name.

According to a disclosed embodiment, the security action may include preventing a download of a file associated with the character element.

According to a disclosed embodiment, the confidence score may be generated using a machine learning algorithm.

According to a disclosed embodiment, the machine learning algorithm may include at least one of a word embedding algorithm, a term-frequency based algorithm, a cosine similarity algorithm, or a k-nearest neighbors algorithm.

According to a disclosed embodiment, the real-time analysis may be performed by a client device.

According to a disclosed embodiment, the real-time analysis may be performed by a server.

According to a disclosed embodiment, identifying a character element may include receiving an indication of the character element from a client device.

According to a disclosed embodiment, the security response may include sending an alert to the client device indicating the character element is potentially malicious.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 5 is a chart depicting exemplary scores for a plurality of domain names, in accordance with disclosed embodiments.

DETAILED DESCRIPTION

Figure 1:
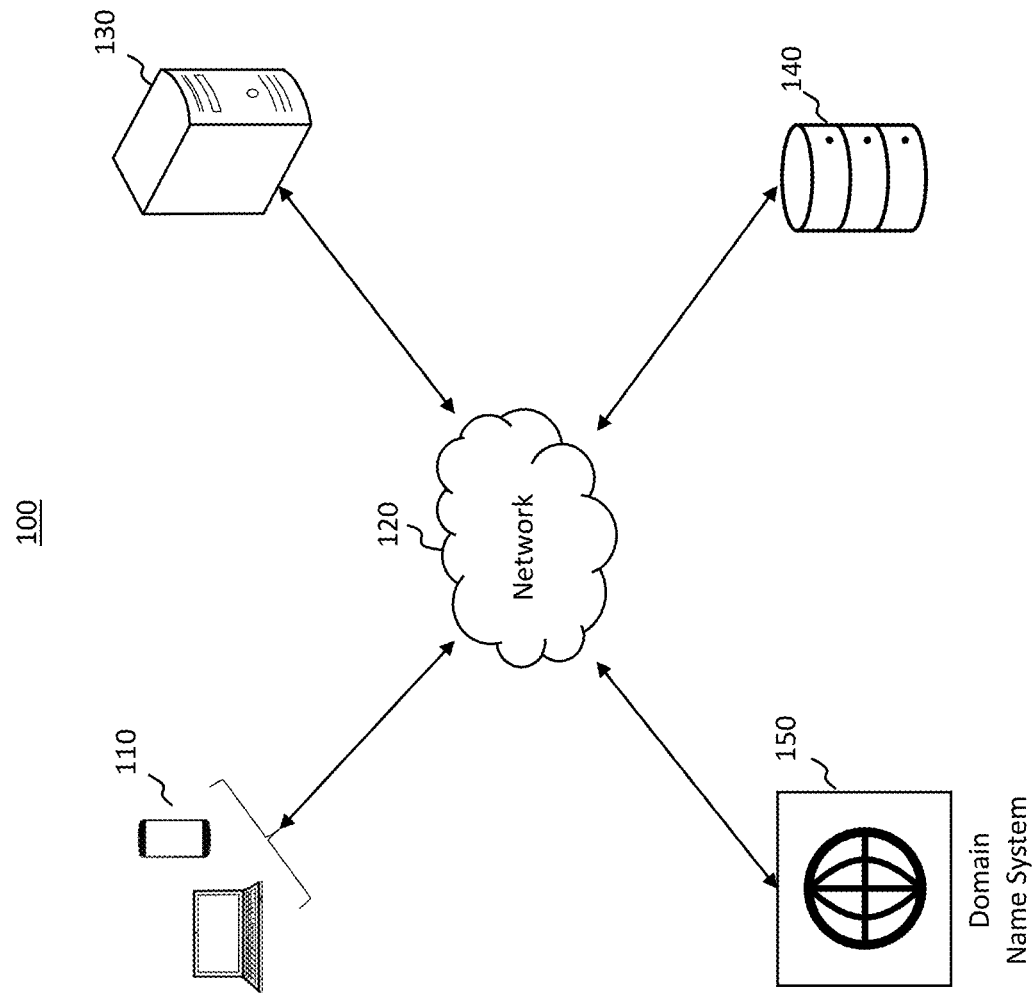
FIG. 1 is a block diagram of an exemplary system for analyzing character elements, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of analyzing character elements described herein overcome several technological problems relating to efficiency and speed of security risk detection. Users may be presented with a variety of links, domain names, files, executables, software packages, etc. while interacting with a computer network. Attackers may create malicious domain names that are similar to legitimate domain names, for example, by varying one or more of the characters of the legitimate domain name. Such creation of malicious domain names, which may be referred to as "typosquatting" or URL hijacking, may permit the malicious user creating the illegitimate domain name to execute an attack on an unsuspecting user's machine or network when the user navigates to the malicious domain (e.g., by making a mistake when typing the legitimate domain name or by clicking a link containing the malicious domain). As an example, the attacker may send a phishing email containing a link to a domain that varies from the domain of a legitimate company by only one letter. The recipient of the email may not notice the single letter variation, and may select the link under the belief that the email originated from the company (and not an attacker). Once the user accesses the link, the attacker may perform various types of attacks (e.g., downloading executables to the user's machine, requesting personal or sensitive user information, etc.).

Disclosed embodiments provide techniques for real-time, seamless detection of malicious domain names and other strings of character elements, which improve network security by identifying and addressing malicious domains in real-time. By identifying malicious domains in real-time, users may be notified that a particular domain name, file, software package, or the like is potentially malicious before navigating to the domain or executing the software. In some embodiments, the user may be prevented from navigating to a malicious domain, downloading a malicious software package, or running a malicious executable. This real-time analysis can be achieved by implementing a model to identify domains (or other character strings), compare them to a target name, and generate a score indicating a similarity between the target name and the domain name. By implementing machine learning and language processing techniques, domains can be analyzed in real-time and security actions can be implemented to thwart potential attacks facilitated by malicious "typosquatted" domains. Additionally, the increased speed and efficiency of disclosed techniques also permit fast and efficient analysis of large batches of domain names. This may permit enterprises to analyze large groups of existing domain names to identify and proactively address malicious domain names similar to their legitimate domain name.

Reference will now be made in detail to the disclosed embodiments, examples of which are illustrated in the accompanying drawings.

FIG. 1 is a block diagram of an exemplary system for analyzing character elements to detect potential security risks. System 100 may include one or more client devices 110, a network 120, one or more servers 130, one or more databases 140, and a domain name system 150, as shown in FIG. 1.

Client device 110 may include a variety of different types of computing devices, including those capable of communicating over a network. For example, client device 110 may be a personal computer (e.g., a desktop or laptop), an IoT device (e.g., sensor, smart television or other home appliance, printer, connected vehicle, industrial device, etc.), a server, a vehicle-based or aircraft-based computer, a virtual machine (e.g., virtualized computer, container instance, etc.), or other device. Client device 110 may also be a handheld device (e.g., a mobile phone, a tablet, notebook, etc.), a wearable device (e.g., a smart watch, a head-mounted display, etc.), or other device capable of processing and/or receiving data.

In certain embodiments, client device 110 may be a terminal-based (e.g., Unix or Linux) computing device. For example, the client device 110 may provide only a terminal interface for interacting with the system. In some embodiments, by contrast, client device 110 may operate using a visual operating system, such as a Windows™ operating system, Apple™ operating system, Android™ operating system, a cloud-based operating system (e.g., through AWS™, Azure™, IBM Cloud™, etc.), or other types of non-terminal operating systems.

Client device 110 may include one or more processors, one or more memories, and one or more input/output (I/O) devices. The processor (or processors) may include one or more data or software processing devices. For example, the processor may take the form of, but is not limited to, a microprocessor, embedded processor, or the like, or may be integrated in a system on a chip (SoC). Furthermore, according to some embodiments, the processor may be from the family of processors manufactured by Intel®, AMD®, Qualcomm®, Apple®, NVIDIA®, or the like. The processor may also be based on the ARM architecture, a mobile processor, or a graphics processing unit, etc. The disclosed embodiments are not limited to any type of processor configured in the client device 110.

A memory (or memories) of client device 110 may include one or more storage devices configured to store instructions used by the processor to perform functions related to the disclosed embodiments. Memory may be configured to store software instructions, such as programs, that perform one or more operations when executed by the processor to analyze character elements, for example, using method 500, described in detail below. The disclosed embodiments are not limited to particular software programs or devices configured to perform dedicated tasks. For example, the memory may store a single program, such as a user-level application, that performs the functions of the disclosed embodiments, or may comprise multiple software programs. For example, an application may be a web browser extension, email application extension, or other application that may analyze character elements, for example elements making up domain names, consistent with disclosed embodiments. As another example, an application may be a dedicated application for analyzing batches of domain names or other character elements, as described in greater detail below. Additionally, the processor may in some embodiments execute one or more programs (or portions thereof) remotely located from the client device 110. Furthermore, the memory may include one or more storage devices configured to store data for use by the programs. In some embodiments, as described above, client device 110 may operate using an operating system. The operating system may be stored in the memory of client device 110.

Client device 110 may also include one or more input/output ("I/O") devices, which may include one or more integrated ports or stand-alone devices configured to allow data to be received and/or transferred by the client device 110. The I/O devices may include one or more network adaptors or communication devices and/or interfaces (e.g., WiFi, Bluetooth®, RFID, NFC, RF, infrared, etc.) to communicate with other machines and devices, such as with other components of system 100 through network 120. In some embodiments, the I/O devices may comprise a touchscreen configured to allow a user to interact with the client device 110, and in some embodiments, the I/O devices may comprise a keyboard, mouse, trackball, touch pad, stylus, and the like. I/O devices may further include a display, such as an LCD screen, LED screen, OLED screen, plasma screen, or other suitable device to visibly present information to a user.

Client device 110 may be in communication with server 130 over network 120. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Server 130 may be configured to process and manage requests for data from other devices within system 100, for example, client device 110. In some embodiments, server 130 may be associated with a website, email service, data streaming service, cloud computing server, data storage service, security service, or other service or organization that may provide data to a user's device. As a non-limiting example, server 130 may be associated with a security service that analyzes character strings received from client device 101, for example, using process 500 as described below. In other embodiments, client device 101 may analyze character strings locally without implementing server 130.

Client device 110 and server 130 may also communicate with database 140. Database 140 may comprise a single database, multiple databases, cloud storage, data lake, or other data storage modalities. In some embodiments, database 140 may be storage local to or integrated with client device 110 or server 130. In other embodiments, database 140 may be separate or remote from client device 110 and/or server 130. Database 140 may store a variety of data in any suitable format. For example, in some embodiments database 140 may be a web server that supplies web content to client devices 110 or other clients. In other embodiments, database 140 may store information related to previously-conducted analysis of domain names or other character elements. For example, database 140 may store a list of reference names, legitimate domain names, analyzed domain names, unanalyzed domain names, or lists of analyzed or unanalyzed character elements.

Figure 2:
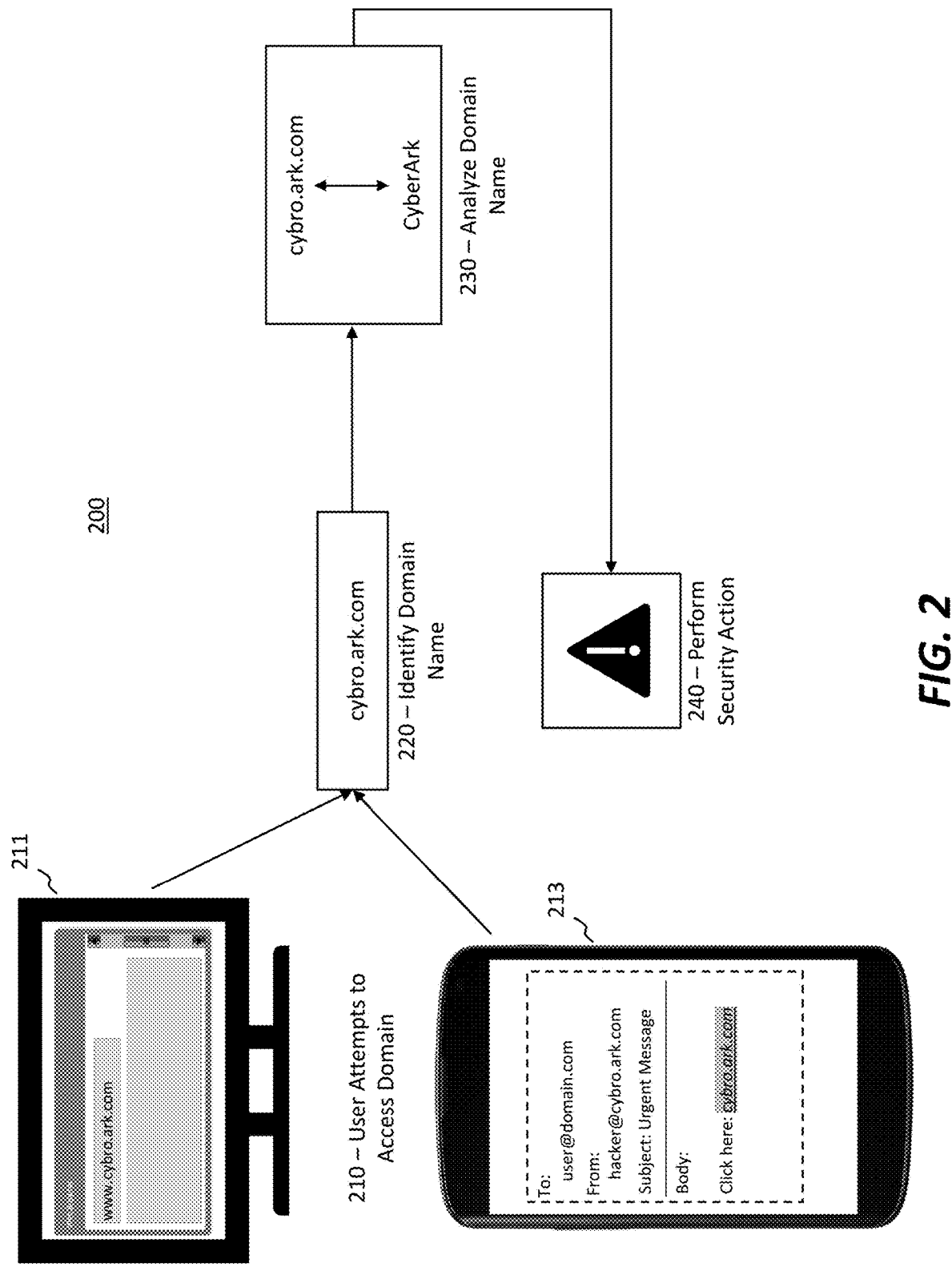
FIG. 2 is an illustration depicting an exemplary process for analyzing domain names, in accordance with disclosed embodiments.

FIG. 2 is an illustration depicting an overview of an exemplary process for analyzing domain names or other character elements, in accordance with disclosed embodiments. As used herein, a character element can be an element comprising alphanumeric characteristics or symbols, including but not limited to letters, numbers, punctuation marks, accents, or other symbols. While FIG. 2 is described as analyzing domain names, character elements are not limited to domain names. For example, a group of character elements may relate to a file path, directory name, file name, domain name, folder name, program/executable name, or other alpha-numeric string or set of symbols.

Process 200 may begin at step 210 when a user attempts to access a domain name. For example, a user may enter a domain name into a web browser. Additionally, or alternatively, the user may receive a domain name related to an email message. For example, the body of an email message may contain a link or other indication of a domain name. In some embodiments, the domain name may be associated with an email address of a sender of the email message.

At step 220, process 200 may include identifying a domain name (or other character element(s)). Domain names may be identified in real-time. Domain names may be identified in a variety of suitable ways, for example, through recognition of a website URL, the presence of a top level domain extension (e.g., .com, .net, .biz, .org, .us, .ca, .gov, or others), through the detection of a hyperlink, based on a character string's location within an interface presented to the user on client device 101 (e.g., within an address bar of a web browser or in "to" or "from" line of an email message), or based on other domain characteristics. For example, a domain name may be identified from a link present on a website or in an email. Domain names may also be associated with email addresses. Other character elements can be identified in similar ways. For example, file paths may be identified based on certain file path characteristics or via links to the file path.

In some embodiments, domain names may be identified using a machine learning algorithm configured to process information and recognize domain names. For example, an algorithm may be trained to process email messages, webpages, or applications and detect domain names within text, links, or graphics. For example, an algorithm may be trained to process all incoming email messages and identify domain names. As described in greater detail below, the algorithm may also be trained to analyze the identified domain names to determine, e.g., whether the domain names are malicious.

With reference to FIG. 2, example 211 illustrates a web browser with a domain name entered into an address bar of the web browser. Thus, as an example, at step 220, process 200 may include identifying the domain name "www.cybro.ark.com" as being entered into the address bar. Similarly, example 213 illustrates an exemplary email message on a mobile device. The email message may be processed at step 220 in order to identify the domain name "cybro.ark.com" as included in both the sender's email address and a link in the body of the message.

At step 230, process 200 may include analyzing the identified domain name. Analyzing the domain name may include applying a language processing protocol to the domain name and generating a score for the domain name. A domain name score may be a confidence score indicating a level of variation of the domain name from a reference name, as described herein. A language processing protocol may be a language processing algorithm, program, method, or other tool that analyzes an input and extracts or separates the input into various constituent parts. For example, the language processing protocol may break an input domain name into subparts that may include words, parts of speech, letters, numbers, phrases, or other suitable subparts or groups of subparts.

A language processing protocol may be implemented using a machine learning algorithm or natural language processing program, including, but not limited to, IBM's Watson Natural Language Understanding™, Amazon Comprehend™, and OpenNLP™, among others. In some other embodiments, the language processing protocol may be implemented by other text or code analytics algorithms. The language processing protocol or tool may analyze the input domain name and extract certain words or characters from the domain name.

A domain name may include a variety of words that may be identified by the language processing protocol and separated. As an example, the language processing protocol may extract keywords or phrases that correspond to different parts of a domain name, such as the top level domain extension. The keywords or phrases may be preidentified. In some embodiments, the language processing tool may be a machine learning algorithm that is trained using multiple differing domain name examples to develop a set of keywords or phrases.

Analyzing the domain name may include inputting the domain name into the language processing protocol. Accordingly, the language processing protocol may break the domain name into subparts that may include words, parts of speech, letters, numbers, phrases, or other suitable subparts. In some embodiments, the language processing protocol may assign vectors to the domain name or subparts of the domain name.

According to disclosed embodiments, the language processing protocol may include a word embedding algorithm. A word embedding algorithm may be a machine learning model used to assign vectors to the domain name or subparts of the domain name. Examples of word embedding algorithms may include Word2Vec, GloVe, or others. In some embodiments, a word embedding algorithm may be part of a larger machine learning model. For example, the word embedding algorithm may be an embedding layer of a neural network. In such an example, the neural network may be configured to identify domain names, create word embedding vectors, compare the vectors of the domain names to a vector for a reference name, generate an output similarity score, and determine, based on the score, whether the domain name is sufficiently similar to the reference to be "typosquatted" (i.e., potentially malicious or illegitimate). The vectors may be used to calculate a distance between the domain name or parts of the domain name and a reference name. The reference name may be a legitimate domain name, organization name, network name, file name, etc. The distance between the domain name vector and the reference name vector may be used to calculate a similarity or confidence score. The distance may be calculated in a variety of ways, as described herein.

In some embodiments, the word embedding algorithm may separate the domain name into a plurality of subparts, or n-grams. For example, the domain name may be separated into character groupings of a certain size (e.g., groupings of 2, 3, or 4 characters). Continuing the example from above, the domain name "cybro.ark may be split into tri-grams of 3 characters: "cyb," "ybr," "bro," "ro.," "o.a," and so on. A reference name "cyberark" may also be split into tri-grams of: "cyb," "ybe," "ber," "era," "rar," and "ark." As another example, "cyberark" may also be split into bi-grams of: "cy," "yb," "be," "er," "ra," etc. The n-grams of the domain name and a reference name may be compared to determine a level of similarity between the names.

Consistent with disclosed embodiments, scores may be calculated for domain names. The scores may indicate the level of similarity between the domain name and a reference name. The score may be generated using a machine learning algorithm trained to compare domain names with reference names using the processed form of the domain names (e.g., output of a language processing protocol). For example, the machine learning algorithm may take as input the domain name, the processed form of the domain name (i.e., the output results of the language processing protocol), and the reference name. The machine learning algorithm may compare the domain name and/or processed domain name to the reference to generate the score.

In some embodiments, the machine learning algorithm may include a list of pre-identified reference names. In such embodiments, the reference name may not be an input to the machine learning algorithm. Accordingly, the machine learning algorithm may be trained to identify a relevant reference name or compare the domain name against the list of pre-identified names. Scores indicating a level of similarity between the domain name and a reference domain name may take a variety of forms. For example, scores may be a numerical score, a relative level (e.g., a low, medium, or high level of similarity), a score on a relative scale (e.g., 1-10 or 1-50), a percentage, or other indication of a level of similarity between the domain name and reference name. Scores may be generated in variety of ways using a variety of machine learning algorithms.

In some embodiments, a term frequency inverse document frequency ("TF-IDF") technique may be used to assign vectors to domain names or other character groups. The TF-IDF approach can be used to assign scores or weights to terms based on their frequency within a large set of data. The more common the term across a large set of data, the less weight the term may have in such an approach. For example, in a group of domain names the word or character sequence "cyberark" may appear in a relatively small number of domains and be assigned a relatively high weight. By contrast, the sequence "com" may appear even more times and be given a lesser weight. The word "support" may appear more times than "cyberark," but many fewer times than "com" and thus be assigned a medium-level weight.

A TF-IDF score may be calculated for each domain name within a group of domain names using frequency of each term within the domain names. Similarly, in some embodiments, if an n-gram approach is also implemented, the score may be based on the frequency of n-gram character sequences throughout the group of domain names. The scores may then be compared to the reference name. If the scores are within a threshold distance of the domain name, the domain names may be determined to the illegitimate or malicious. The scores may be in the form of vectors, thus a vector may be assigned to each domain name, or domain name subpart, and to the reference name. Then, the distance between the domain name and the reference name may be calculated as used as a measure of the similarity between the names.

The TF-IDF score can be calculated using the following equation: $W_D = TF \times \ln(N/D_F)$. $W_D$ can represent the TF-IDF score of a term or n-gram within a domain name. TF can be the term frequency of a term or n-gram within the domain name. TF may be calculated by divided the total number of times the term or n-gram appears in the domain name by the total number of terms or n-grams present in the domain name. N can be the total number of domain names in a group of domain names being evaluated. $D_F$ can be the number of domain names in the group of domain names that includes the term.

The calculated value of $W_D$ can then be plotted as a vector. Additionally, or alternatively, the various values of $W_D$ for constituent parts of a domain name may be added together to form a TF-IDF score for the domain name and plotted a single vector. Similarly, the value for a reference name may be calculated. Then, the distance between the reference name vector and the domain name vector may be calculated.

Consistent with disclosed embodiments, the distance between vectors may be calculated in a variety of suitable ways. For example, a machine learning model may be used to calculate distance scores. Machine learning models may include a K-nearest neighbors model or other suitable machine learning models. For example, a K-nearest neighbors algorithm may be configured to cluster domain names and determine which domain names within a group are most similar to a target or reference name. In some embodiments, a K-nearest neighbors algorithm may be used in conjunction with TF-IDF scores. The TF-IDF scores may be used to influence weights of the K-nearest neighbors algorithm to emphasize important terms or n-grams and place less emphasis on less important terms or n-grams. Domain names or n-grams clustered with the reference name may be determined to be potentially malicious or typo-squatted.

Other ways of calculating distance between vectors are possible. Each domain name and the reference name may be plotted in an n-dimensional space and the distance between each domain name and the reference name may be calculated. The plotting may be performed based on, for example, the presence, or non-presence, of identified terms or n-grams within the reference name.

Figure 3:
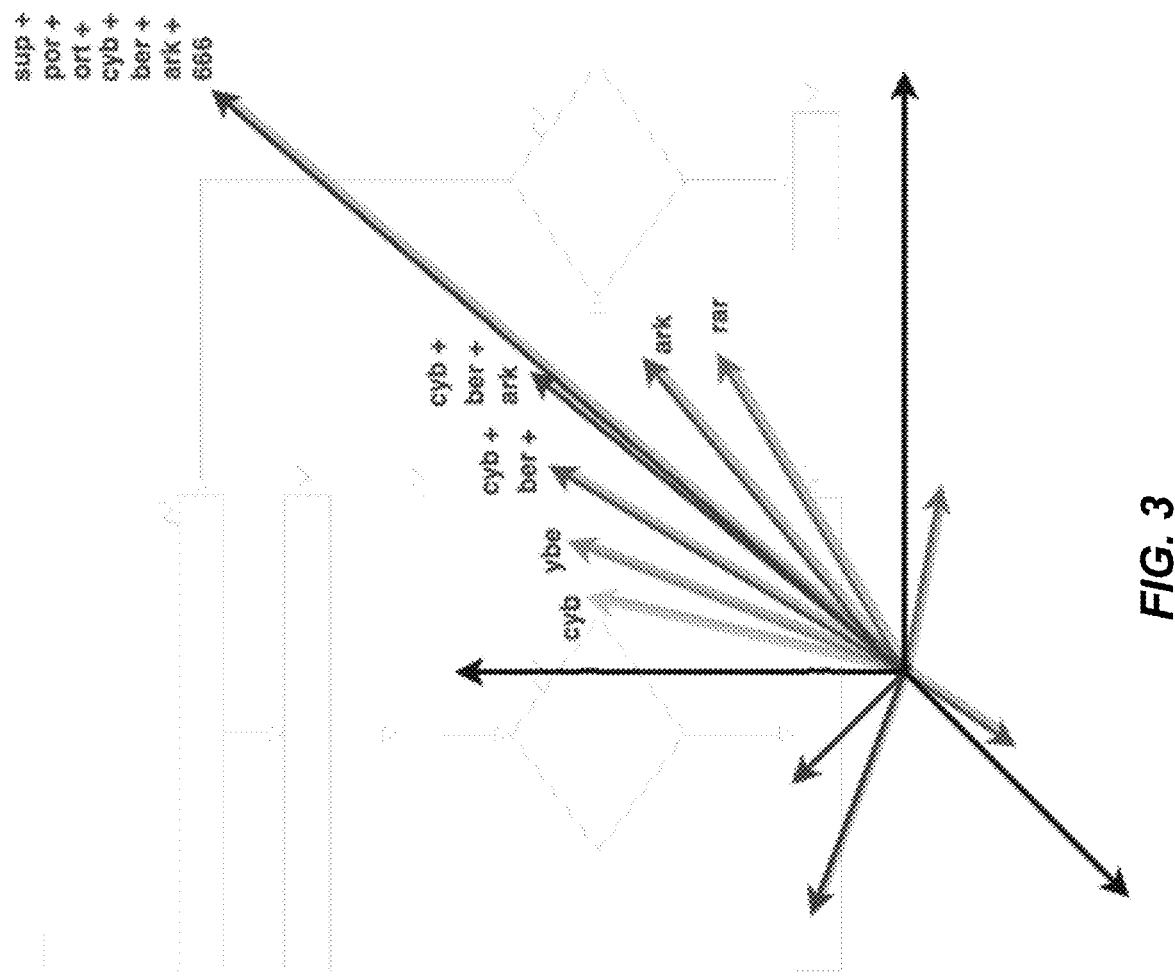
FIG. 3 is an illustration depicting an exemplary similarity measurements graph, in accordance with disclosed embodiments.

The distance between the plotted vectors may be calculated in a variety of suitable ways. For example, the distance magnitude may be calculated using a Euclidian (straight line) distance, Manhattan distance, Minkowski distance, Hamming distance, or other suitable method. The direction of the distance may also be calculated by a suitable method, for example, using cosine similarity. Other distance calculations are possible, such as a Pearson's Correlation that accounts for both magnitude and direction. An exemplary cosine similarity graph calculation using n-gram of "supportcyberark666" is illustrated by FIG. 3. As illustrated in FIG. 3, the closest of the plotted tri-grams to "supportcyberark666" is the combination of "cyb," "ber," and "ark," as all three tri-grams are present in the reference name of "supportcyberark666." By contrast, the single tri-gram of "cyb," although present in the reference, is not as close because it is less similar. The cosine similarity, or other distance calculation method may be employed, for example, within a k-nearest neighbors algorithm implementation to calculate distances.

According to disclosed embodiments, step 230 may include determining whether the domain name being analyzed is identical to the reference name. For example, when a domain name is identical to the reference name, it may be determined that the domain name is the legitimate domain name related to the reference name. Accordingly, legitimate domain names may not be filtered out by disclosed methods and security actions may not be taken for those legitimate domain names, but other illegitimate domain names having sufficient similarity scores will still be identified.

Referring back to FIG. 2, at step 240, process 200 may include performing a security action. The security action may be performed based on the domain name analysis. A variety of security actions based on the domain name analysis are possible. For example, a security action may include sending an alert indicating the domain name is potentially malicious, "typosquatted," or otherwise illegitimate. Server 130 may send an alert to the user on client device 110 indicating that the domain name is potentially malicious. Alerts may take a variety of forms, such as an email, notification, pop-up, text-message, warning, or other form suitable for notifying a user that a domain name is potentially illegitimate. In some embodiments, a security action may include displaying a visual notation associated with the domain name, such as a flag near the domain name, a highlight of the domain name, a circle or other shape placed around the domain name, or other visual cue suitable for drawing a user's attention to the domain name to indicate that the domain name may be problematic. As an example, a warning flag may be placed next to the domain name on the user interface (e.g., in the address bar of an internet browser, in the "from:" line of an email, or others).

As yet another example, a security action may include blocking access to the domain name. For example, when the domain name is sufficiently similar to be determined to be potentially malicious, server 130 or client device 110 may block access to the domain name and not connect to the server associated with the domain name. As a further example, when the domain name is associated with an email address, a security action may include preventing an email from being sent to an email address associated with the domain name. Similarly, a security action may also include preventing an email from being received from an email address associated with the domain name.

In examples where the analysis is being conducted on a character element (e.g., a file name, file path, executable, or others), security actions may include preventing a file associated with the character element from being downloaded, preventing opening of an associated file, preventing navigation to an associated file path, preventing execution of an associated executable, or the like. As another example, a security action may include generating a notification that the particular analyzed character element(s) is illegitimate or potentially malicious.

Figure 4:
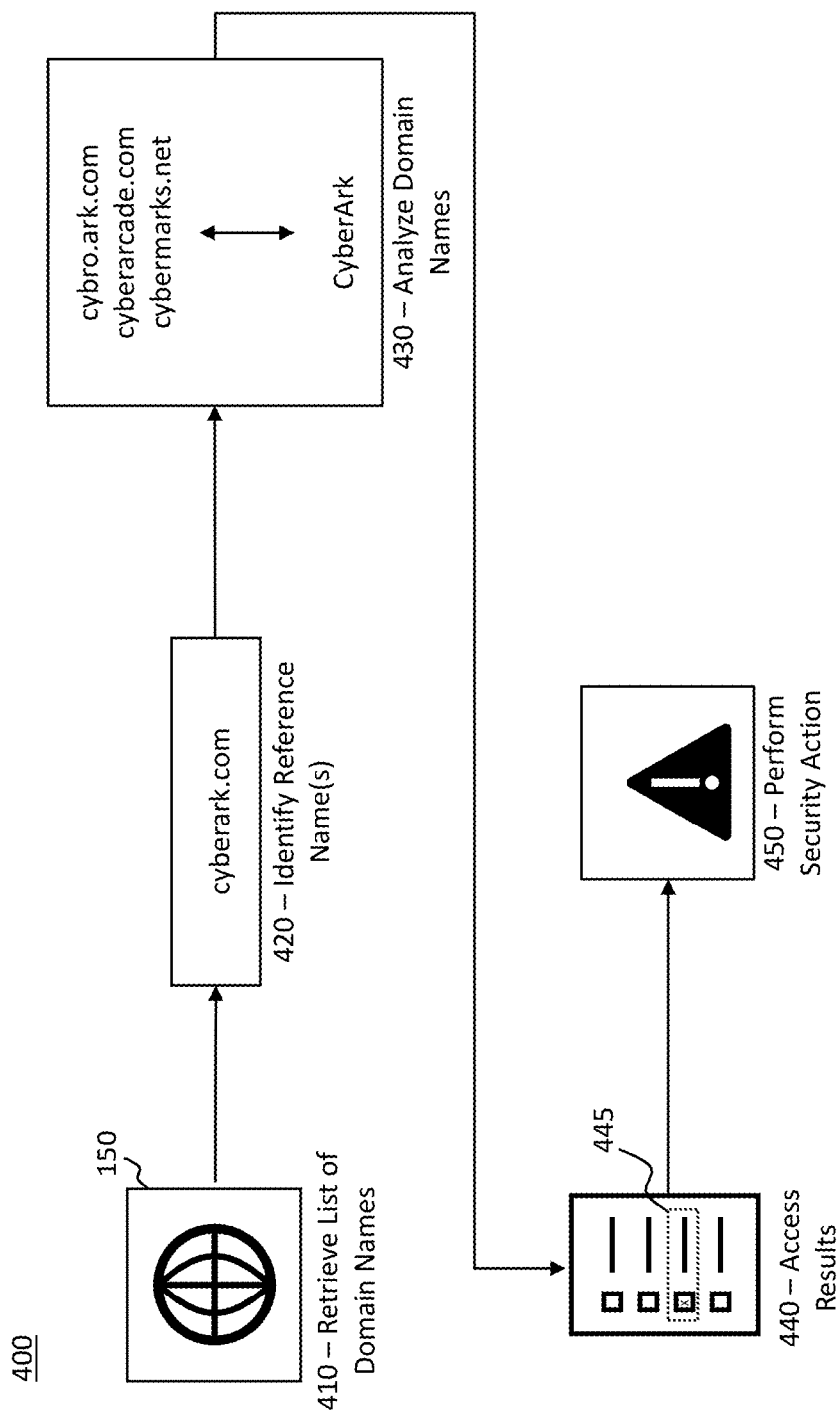
FIG. 4 is an illustration depicting an exemplary process for batch analyzing domain names, in accordance with disclosed embodiments.

FIG. 4 is an illustration depicting an overview of exemplary process 400 for batch analyzing domain names or other character elements, in accordance with disclosed embodiments. While FIG. 4 is described as analyzing domain names, batch analysis of other groups of character elements can be conducted. For example, a group of character elements may relate to a file path, directory name, file name, domain name, folder name, program/executable name, or other alpha-numeric string or set of symbols. Process 400 may be executed by, for example, server 130.

At step 410, process may include retrieving a list of domain names. The list of domain names may be retrieved from domain name system 150 by server 130 or client device 110. In some embodiments, the list of domain names may include a plurality of newly created domain names. For example, server 130 may access domain name system 150 and retrieve a list of all domains published on a certain date or within a certain time period. A list of domain names may also be created according to another suitable criterion. As another example, server 130 may retrieve a list of file names, such as a list of software packages available in a software repository, such as GitHub™.

At step 420, process 400 may include identifying a reference name or names. The reference name may be a legitimate domain name. As another example, the reference name may be a name of legitimate software package available for download from a repository. It may be desirable to detect illegitimate or malicious domain names that are similar to the reference name to take appropriate action (e.g., acquiring the domain name, having the domain name taken down or deactivated, blocking access, or actions to prevent or otherwise limit the ability of the illegitimate domain name to facilitate attacks). A company may wish to have malicious domain names or software packages taken down because attacks launched on unsuspecting users through these similar domains or software packages may, for example, negatively effect the reputation of the company. In some embodiments, the reference name may be accessed from a stored list of reference names, for example, stored by server 130 or database 140. Additionally, or alternatively, a reference name may be identified by receiving the reference name via user input, for example, through client device 110. Client device 110 may then communicate the reference name to server 130.

At step 430, process 400 may include analyzing domain names of the list of domain names. Each domain name of the list may be individually analyzed, the domain name being compared to the reference name to generate a similarity confidence score and determine if the domain name is potentially malicious or "typosquatted." Analyzing the domain name may include applying a language processing protocol to the domain name. As described herein, a language processing protocol may be a language processing algorithm, program, method, or other tool that analyzes an input and extracts or separates the input into various constituent parts. For example, the language processing protocol may break an input domain name into subparts that may include words, parts of speech, letters, numbers, phrases, or other suitable subparts or groups of subparts.

Analyzing the domain name may include inputting the domain name into the language processing protocol. Accordingly, the language processing protocol may break the domain name into subparts that may include words, parts of speech, letters, numbers, phrases, or other suitable subparts. In some embodiments, the language processing protocol may assign vectors to the domain name or subparts of the domain name.

According to disclosed embodiments, the language processing protocol may include a word embedding algorithm. A word embedding algorithm may be a machine learning model used to assign vectors to the domain name or subparts of the domain name. In some embodiments, a word embedding algorithm may be part of a larger machine learning model. For example, the word embedding algorithm may be an embedding layer of a neural network. In this example, the neural network may be configured to identify domain names, create word embedding vectors, compare the vectors of the domain names to a vector for a reference name, generate an output similarity score, and determine, based on the score, whether the domain name is sufficiently similar to the reference to be "typosquatted" (i.e., potentially malicious or illegitimate). The vectors may be used to calculate a distance between the domain name or parts of the domain name and a reference name. The reference name may be a legitimate domain name, organization name, network name, file name, etc. The distance between the domain name vector and the reference name vector may be used to calculate a similarity or confidence score. The distance may be calculated in a variety of ways, as described herein.

In some embodiments, a word embedding algorithm may separate a domain name into a plurality of subparts, or n-grams. For example, the domain name may be separated into character groupings of a certain size (e.g., groupings of 2, 3, or 4 characters). Continuing the example from above, the domain name "cybro.ark may be split into tri-grams of 3 characters: "cyb," "ybr," "bro," "ro.," "o.a," and so on. A reference name "cyberark" may also be split into tri-grams of: "cyb," "ybe," "ber," "era," "rar," and "ark." As another example, "cyberark" may also be split into bi-grams of: "cy," "yb," "be," "er," "ra," etc. The n-grams of the domain name and a reference name may be compared to determine a level of similarity between the names.

In some embodiments, a term frequency inverse document frequency ("TF-IDF") technique may be used to assign vectors to domain names or other character groups. As described herein, the TF-IDF approach can be used to assign scores or weights to terms based on their frequency within a large set of data. The more common the term across a large set of data, the less weight the term may have in such an approach. For example, in a group of domain names the word or character sequence "cyberark" may appear in a relatively small number of domains and be assigned a high weight. By contrast, the sequence "com" may appear even more times and be given a lesser weight. The word "support" may appear more times than "cyberark," but many fewer times than "com" and thus be assigned a medium-level weight.

A TF-IDF score may be calculated for each domain name within a group of domain names using frequency of each term within the domain names. Similarly, in some embodiments, if an n-gram approach is also implemented, the score may be based on the frequency of n-gram character sequences throughout the group of domain names. The scores may then be compared to the reference name. If the scores are within a threshold distance of the domain name, the domain names may be determined to be illegitimate or malicious. The scores may be in the form of vectors, thus a vector may be assigned to each domain name, or domain name subpart, and to the reference name. Then, the distance between the domain name and the reference name may be calculated as used as a measure of the similarity between the names.

Consistent with disclosed embodiments, the distance between vectors may be calculated in a variety of suitable ways. For example, a machine learning model may be used to calculate distance scores. Machine learning models may include a K-nearest neighbors model or other suitable machine learning models. For example, a K-nearest neighbors algorithm may be configured to cluster domain names and determine which domain names within a group are most similar to a target or reference name. Each domain name and the reference name may be plotted in an n-dimensional space and the distance between each domain name and the reference name may be calculated. The plotting may be performed based on, for example, the presence, or non-presence, of identified terms or n-grams within the reference name. As described herein, in some embodiments, a K-nearest neighbors algorithm may be used in conjunction with TF-IDF scores.

The distance between the plotted vectors may be calculated in a variety of suitable ways. For example, the distance magnitude may be calculated using a Euclidian (straight line) distance, Manhattan distance, Minkowski distance, Hamming distance, or other suitable method. The direction of the distance may also be calculated by a suitable method, for example, using cosine similarity. Other distance calculations are possible, such as a Pearson's Correlation that accounts for both magnitude and direction.

Accordingly, each domain name from the list of domain names retrieved at step 410 may be analyzed and compared against the reference name to generate a score for each domain name. The scores may be generated such that they are normalized and fall within a certain range (e.g., 0 to 1, 0 to 10, 1 to 100, etc.). The scores for each domain name may be stored, for example, by server 130 or database 140. FIG. 5. illustrates a list of exemplary domain names and corresponding scores. The scores shown in FIG. 5 are merely exemplary. It is understood that scores may vary based on the method or model of calculation, the reference name, normalization, scale, and other factors. However, as illustrated by FIG. 5, domain names that are more similar to the reference name may have a relatively higher score. Put differently, the greater variation of a domain name from the reference, the lower the domain name's score may be. As described herein, scores may indicate a confidence level of the similarity between a domain name and the reference name. As an example, when compared to reference name "cyberark," the domain name "cyberpunk.com" has a lower score than "cyberarkai.xyz," a domain name that actually includes the entirety of the reference name.

Referring back to FIG. 4, at step 440, process 400 may include accessing the results of the domain name analysis. Accessing the results may include accessing a list or data related to the results of the domain analysis, for example, a list of domains and associated scores, as shown in FIG. 5. Results may be accessed in a variety of ways including, but not limited to, accessing a list of the domains and associated scores (e.g., as illustrated by FIG. 5), accessing a list of only the domains having scores exceeding a threshold, accessing a copy of the list of domains with the domains exceeding a threshold scores being highlighted or otherwise emphasized, retrieved from storage, or other suitable methods. Consistent with disclosed embodiments, results may be accessed by server 130, received from server 130 by client device 110, stored by database 140, sent as a notification from server 130 to client device 110.

Accessing the results may include identifying domain names that exceed a threshold score level. The threshold score level may indicate that the domain name is sufficiently similar to a reference name to be potentially malicious or typo-squatted. Continuing the example of FIG. 5, a score threshold may be set at 0.9. Accordingly, "cybrark.com," "cybermark.net," and "cyberarkai.xyz" may be identified as potentially malicious domains as compared to "cyberark."

In some embodiments, when none of the domain names on the list are sufficiently similar to the reference name, there may be no results of note to access. Accordingly, accessing the results may include determining that none of the domain names are sufficiently similar to a domain name (e.g., none of the domain names exceed the threshold score). Step 440 may also include providing an indication to client device 110 that none of the listed domain names are sufficiently similar to cause a "typosquatting" issue. In such embodiments, process 400 may end at step 440. In cases where one or more domain names are sufficiently similar to a reference name, process 400 may proceed to step 450.

According to disclosed embodiments, step 440 may include determining whether the domain name being analyzed is identical to the reference name. For example, when a domain name is identical to the reference name, it may be determined that the domain name is the legitimate domain name related to the reference name. Accordingly, legitimate domain names may not be filtered out by disclosed methods and security actions may not be taken for those legitimate domain names, but other illegitimate domain names having sufficient similarity scores will still be identified.

At step 450, process 400 may include performing a security action. The security action may be performed based on the domain name analysis. A variety of security actions based on the domain name analysis are possible. For example, a security action may include sending an alert indicating that the domain name(s) having a score exceeding the threshold is potentially malicious, "typosquatted," or otherwise illegitimate. Server 130 may send an alert to the user on client device 110 indicating that the domain name(s) is potentially malicious. Alerts may take a variety of forms, such as an email, notification, pop-up, text-message, warning, or other form suitable for notifying a user that a domain name is potentially illegitimate. For example, the server may send file to client device 110 having the list of potentially malicious domain names. A human user of client device 110 may then take further action, for example, to have the domain names taken down. In some embodiments, a security action may include displaying a visual notation associated with the domain name, such as a flag near the domain name, a highlight of the domain name, a circle or other shape placed around the domain name, or other visual cue suitable for drawing a user's attention to the domain name to indicate that the domain name may be problematic. As an example, a warning flag may be placed next to the domain name on the user interface (e.g., in the address bar of an internet browser, in the "from:" line of an email, or others).

As yet another example, a security action may include blocking access to the domain name. For example, when the domain name is sufficiently similar to be determined to be potentially malicious, server 130 or client device 110 may block access to the domain name and not connect to the server associated with the domain name. As a further example, when the domain name is associated with an email address, a security action may include preventing an email from being sent to an email address associated with the domain name. Similarly, a security action may also include preventing an email from being received from an email address associated with the domain name.

Figure 6:
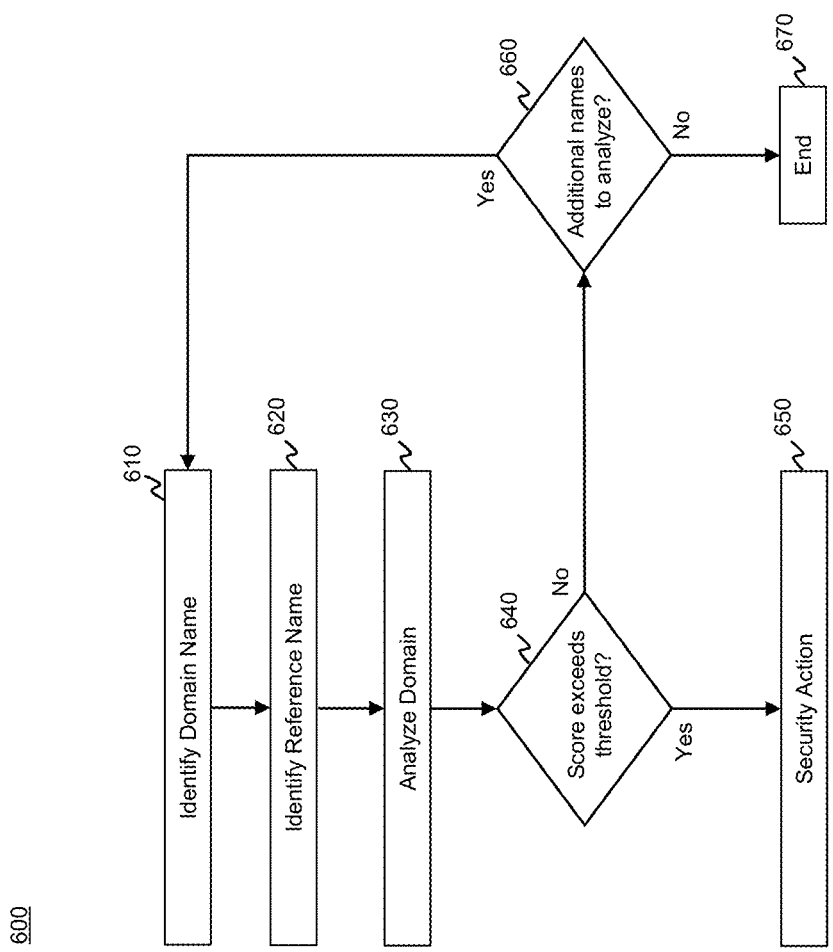
FIG. 6 is a flowchart depicting an exemplary process for analyzing domain names, in accordance with disclosed embodiments.

FIG. 6 is a flowchart depicting an exemplary process 600 for batch analyzing character elements, in accordance with disclosed embodiments. Process 600 may be implemented, for example by client device 110 or server 130, shown in FIG. 1. Process 600 could be performed dynamically as a client device or server receives emails. In other embodiments, process 600 may be performed on demand, for example when a user attempts to access a website via the user's web browser, for example by entering a URL or activating a link. As another more specific example, if server 130 is a proxy server, process 600 may be implemented by server 130 in response to a request for access a URL by client device 110. Client device 110 may send the URL to server 130 for analysis using process 600. If the URL passes the analysis, then client device 110 may be permitted to access the website. As yet another example, process 600 or parts of process 600 may be implemented by a dedicated application for internet security. In some embodiments, process 600 may be executed as a plugin or extension for a web browser (e.g., Google Chrome™ or others) or email application (e.g., Microsoft Outlook™ or others).

While process 600 is described below with respect to domain names, it is understood that process 600 may implemented to analyze other character elements. For example, process 600 may implemented to analyze character elements associated with file paths, software package names, executable names, download file names, or others as described herein.

At step 610, process 600 may include identifying a domain name. At step 220, process 200 may include identifying a domain name (or other character element(s)). Domain names may be identified in real-time. Domain names may be identified in a variety of suitable ways, for example, through recognition of a website URL, the presence of a top level domain extension (e.g., .com, .net, .biz, .org, .us, .ca, .gov, or others), through the detection of a hyperlink, based on a character string's location within an interface presented to the user on client device 101 (e.g., within an address bar of a web browser or in "to" or "from" line of an email message), or based on other domain characteristics. For example, a domain name may be identified from a link present on a website or in an email. Domain names may also be associated with email addresses. Other character elements can be identified in similar ways. For example, file paths may be identified based on certain file path characteristics or via a links to the file path. A machine learning model may be implemented to analyze web pages, emails, etc. on the fly and identify domain names in real time.

In some embodiments, domain names may be identified using a machine learning algorithm configured to process information and recognize domain names. For example, an algorithm may be trained to process email messages, webpages, or applications and detect domain names within text, links, or graphics. For example, an algorithm may be trained to process all incoming email messages and identify domain names. As described in greater detail below, the same machine learning model or a different model may also be trained to analyze the identified domain names to determine, e.g., whether the domain names are malicious.

Consistent with disclosed embodiments, identifying a domain name at step 610 may include identifying a domain name from a list of domain names. For example, a list of newly registered domain names may be obtained from domain name system 150. Accordingly, a domain name from the list may be selected and then analyzed consistent with the other steps of process 600. For example, the first domain name from the list may be selected and analyzed. Once the analysis of the first domain name is performed, the second domain name from the list may be selected and analyzed. Thus, each domain name on the list may be selected and analyzed using process 600.

At step 620, process 600 may include identifying a reference name. The reference name may be a legitimate domain name. As another example, the reference name may be a name of legitimate software package available for download from a repository. It may be desirable to detect illegitimate or malicious domain names that are similar to the reference name to take appropriate action (e.g., acquiring the domain name, having the domain name taken down or deactivated, blocking access, or actions to prevent or otherwise limit the ability of the illegitimate domain name to facilitate attacks). A company may wish to have malicious domain names or software packages taken down because attacks launched on unsuspecting users through these similar domains or software packages may, for example, negatively effect the reputation of the company. In some embodiments, the reference name may be accessed from a stored list of reference names, for example, stored by server 130 or database 140. Additionally, or alternatively, a reference name may be identified by receiving the reference name via user input, for example, through client device 110. Client device 110 may then communicate the reference name to server 130.

At step 630, process 600 may include analyzing the identified domain name. Analyzing a domain name may be executed in a variety of ways as described herein, for example using one or more steps of process 700 described below with respect to FIG. 7. Analysis may be conducted to generate a score for the domain name indicating the similar between the domain name and the reference name. As an example, a score may be a normalized score falling within a certain range (e.g., 0 to 1 or 1 to 100). A higher score for a domain name may indicate that the domain name is relatively more similar to the reference name.

At step 640, process 600 may include determining whether the score exceeds a threshold score. Accordingly, step 640 may include retrieving the threshold score. The threshold score may be stored locally on client device 110 or server 130. In some embodiments, the threshold score may be stored in database 140. Accordingly, client device 110 or server 130 may retrieve the threshold from database 140. Step 640 may include comparing the domain name score calculated at step 630 to the threshold score. If the score exceeds the threshold, process 600 may proceed to step 650.

At step 650, process 600 may include performing a security action. A variety of security actions based on the domain name analysis are possible. For example, a security action may include sending an alert indicating that the domain name(s) having a score exceeding the threshold is potentially malicious, "typosquatted," or otherwise illegitimate. Server 130 may send an alert to the user on client device 110 indicating that the domain name(s) is potentially malicious. In other embodiments, the alert may be generated by and provided to the user by client device 110. Alerts may take a variety of forms, such as an email, notification, pop-up, text-message, warning, or other form suitable for notifying a user that a domain name is potentially illegitimate. For example, server 130 may send a file to client device 110 having a list of potentially malicious domain names. A human user of client device 110 may then take further action, for example, to have the domain names taken down. In some embodiments, a security action may include displaying a visual notation associated with the domain name, such as a flag near the domain name, a highlight of the domain name, a circle or other shape placed around the domain name, or other visual cue suitable for drawing a user's attention to the domain name to indicate that the domain name may be problematic. As an example, a warning flag may be placed next to the domain name on the user interface (e.g., in the address bar of an internet browser, in the "from:" line of an email, or others).

As yet another example, a security action may include blocking access to the domain name. For example, when the domain name is sufficiently similar to be determined to be potentially malicious, server 130 or client device 110 may block access to the domain name and not connect to the server associated with the domain name. As a further example, when the domain name is associated with an email address, a security action may include preventing an email from being sent to an email address associated with the domain name. Similarly, a security action may also include preventing an email from being received from an email address associated with the domain name.

If the domain name's score does not exceed the threshold, process 600 may proceed to step 660 and not perform a security action. At step 660, process 600 may include determining whether there are additional domain names to analyze. For example, an email may contain a link. Process 600 may initially include analyzing a domain name associated with the email address of the sender of the email. Then at step 660, process 600 may include recognizing that the link also includes a domain name to be analyzed. Accordingly, process 600 may then revert back to step 610 and identify the domain name in the link for analysis. If there are no additional domain names to be analyzed, process 600 may end at step 670.

Figure 7:
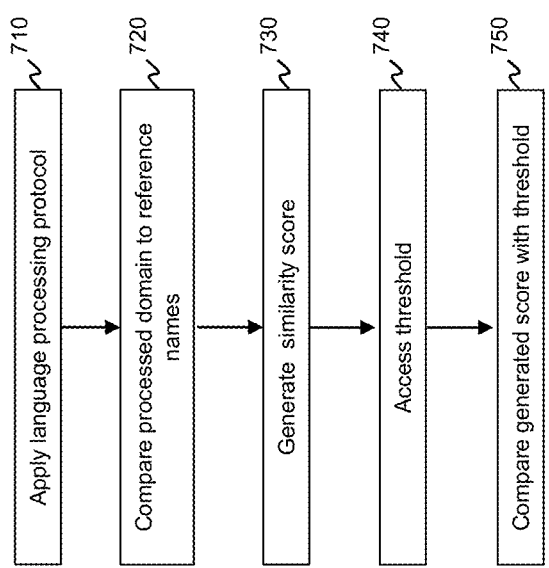
FIG. 7 is a flowchart depicting an exemplary process for analyzing domain names, in accordance with disclosed embodiments.

FIG. 7 is a flowchart depicting an exemplary process 700 for analyzing character elements, in accordance with disclosed embodiments. Process 700 may be implemented, for example by client device 110 or server 130, shown in FIG. 1. Process 700 could be performed dynamically as a client device or server receives emails. In other embodiments, process 700 may be performed on demand, for example when a user attempts to access a website user web browser, for example by entering a URL or activating a link. As another more specific example, if server 130 is a proxy server, process 700 may be implemented by server 130 in response to a request for access a URL by client device 110. Client device 110 may send the URL to server 130 for analysis using process 700. If the URL passes the analysis, then client device 110 may be permitted to access the website. As yet another example, process 700 or parts of process 700 may be implemented by a dedicated application for internet security. In some embodiments, process 700 may be executed as a plugin or extension for a web browser (e.g., Google Chrome™ or others) or email application (e.g., Microsoft Outlook™ or others).

While process 700 is described below with respect to domain names, it is understood that process 700 may implemented to analyze other character elements. For example, process 700 may implemented to analyze character elements associated with file paths, software package names, executable names, download file names, or others as described herein.

At step 710, process 700 may include applying a language processing protocol. As described herein, a language processing protocol may be a language processing algorithm, program, method, or other tool that analyzes an input and extracts or separates the input into various constituent parts. For example, the language processing protocol may break an input domain name into subparts that may include words, parts of speech, letters, numbers, phrases, or other suitable subparts or groups of subparts. A language processing protocol may be implemented using a machine learning algorithm or natural language processing program, including, but not limited to, IBM's Watson Natural Language Understanding™, Amazon Comprehend™ and OpenNLP™, among others. The language processing protocol or tool may analyze the input domain name and extract certain words or characters from the domain name.

According to disclosed embodiments, the language processing protocol may include a word embedding algorithm. As described herein, a word embedding algorithm may be a machine learning model used to assign vectors to the domain name or subparts of the domain name. Examples of word embedding algorithms may include Word2Vec, GloVe, or others. In some embodiments, a word embedding algorithm may be part of a larger machine learning model. For example, the word embedding algorithm may be an embedding layer of a neural network. In such an example, the neural network may be configured to identify domain names, create word embedding vectors, compare the vectors of the domain names to a vector for a reference name, generate an output similarity score, and determine, based on the score, whether the domain name is sufficiently similar to the reference to be "typosquatted" (i.e., potentially malicious or illegitimate). The vectors may be used to calculate a distance between the domain name or parts of the domain name and a reference name. The reference name may be a legitimate domain name, organization name, network name, file name, etc. The distance between the domain name vector and the reference name vector may be used to calculate a similarity or confidence score. The distance may be calculated in a variety of ways, as described herein.

In some embodiments, the word embedding algorithm may separate the domain name into a plurality of subparts, or n-grams. For example, the domain name may be separated into character groupings of a certain size (e.g., groupings of 2, 3, or 4 characters). Continuing the example from above, the domain name "cybro.ark may be split into tri-grams of 3 characters: "cyb," "ybr," "bro," "ro.," "o.a," and so on. A reference name "cyberark" may also be split into tri-grams of: "cyb," "ybe," "ber," "era," "rar," and "ark." As another example, "cyberark" may also be split into bi-grams of: "cy," "yb," "be," "er," "ra," etc. The n-grams of the domain name and a reference name may be compared to determine a level of similarity between the names.

At step 720, process 700 may include comparing the processed domain name to reference names. Comparing the processed domain name may include generating vectors or scores for the domain name or subparts of the processed domain name. Step 720 may also include generating a vector for the reference name.

Consistent with disclosed embodiments, scores may be calculated for domain names. The scores may indicate the level of similarity between the domain name and a reference name. The score may be generated using a machine learning algorithm trained to compare domain names with reference names using the processed form of the domain names (e.g., output of a language processing protocol). For example, the machine learning algorithm may take as input the domain name, the processed form of the domain name (i.e., the output results of the language processing protocol), and the reference name. The machine learning algorithm may compare the domain name and/or processed domain name to the reference to generate the score. Accordingly, in some embodiments, steps 720 and 730 of process 700 may collapse into a single step.

In some embodiments, the machine learning algorithm may include a list of pre-identified reference names. In such embodiments, the reference name may not be an input to the machine learning algorithm. Accordingly, the machine learning algorithm may be trained to identify a relevant reference name or compare the domain name against the list of pre-identified names. Scores indicating a level of similarity between the domain name and a reference domain name may take a variety of forms. For example, scores may be a numerical score, a relative level (e.g., a low, medium, or high level of similarity), a score on a relative scale (e.g., 1-10 or 1-50), a percentage, or other indication of a level of similarity between the domain name and reference name. Scores may be generated in variety of ways using a variety of machine learning algorithms.

As described herein, in some embodiments, a term frequency inverse document frequency ("TF-IDF") technique may be used to assign vectors to domain names or other character groups. The TF-IDF approach can be used to assign scores or weights to terms based on their frequency within a large set of data. A TF-IDF score may be calculated for each domain name within a group of domain names using frequency of each term within the domain names. Similarly, in some embodiments, if an n-gram approach is also implemented, the score may be based on the frequency of n-gram character sequences throughout the group of domain names. The scores may be in the form of vectors, thus a vector may be assigned to each domain name, or domain name subpart, and to the reference name. Then, the distance between the domain name and the reference name may be calculated as used as a measure of the similarity between the names. The TF-IDF score can be calculated as described above and plotted as a vector.

At step 730, process 700 may include generating a similarity score for the domain name. The similarity score may indicate the distance between the vector(s) of the domain name and the vector of the reference name. Consistent with disclosed embodiments, the distance between vectors may be calculated in a variety of suitable ways. For example, a machine learning model may be used to calculate distance scores. Machine learning models may include a K-nearest neighbors model or other suitable machine learning models. For example, a K-nearest neighbors algorithm may be configured to cluster domain names and determine which domain names within a group are most similar to a target or reference name. In some embodiments, a K-nearest neighbors algorithm may be used in conjunction with TF-IDF scores. The TF-IDF scores may be used to influence weights of the K-nearest neighbors algorithm to emphasize important terms or n-grams and place less emphasis on less important terms or n-grams. Domain names or n-grams clustered with the reference name may be determined to be potentially malicious or typo-squatted.

Consistent with disclosed embodiments, other ways of calculating distance between vectors are possible. Each domain name and the reference name may be plotted in an n-dimensional space and the distance between each domain name and the reference name may be calculated. The plotting may be performed based on, for example, the presence, or non-presence, of identified terms or n-grams within the reference name. The distance between the plotted vectors may be calculated in a variety of suitable ways. For example, the distance magnitude may be calculated using a Euclidian (straight line) distance, Manhattan distance, Minkowski distance, Hamming distance, or other suitable method. The direction of the distance may also be calculated by a suitable method, for example, using cosine similarity. Other distance calculations are possible, such as a Pearson's Correlation that accounts for both magnitude and direction. The cosine similarity, or other distance calculation method may be employed, for example, within a k-nearest neighbors algorithm implementation to calculate distances.

According to disclosed embodiments, step 730 may include determining whether the domain name being analyzed is identical to the reference name. For example, when a domain name is identical to the reference name, it may be determined that the domain name is the legitimate domain name related to the reference name. Accordingly, legitimate domain names may not be filtered out by disclosed methods and security actions may not be taken for those legitimate domain names, but other illegitimate domain names having sufficient similarity scores will still be identified.

At step 740, process 700 may include accessing a threshold score. As described herein, a threshold score may be stored in and retrieved from a variety of locations. In some embodiments, the threshold score may be stored locally on client device 110 or server 130. Additionally, or alternatively, the threshold score may be stored in database 140. Accordingly, client device 110 or server 130 may retrieve the threshold from database 140. In yet further embodiments, the threshold score may be user defined.

At step 750, process 700 may include comparing the generated score for the domain name with the threshold score. Accordingly, process 700 may include determining whether the score exceeds a threshold score. If the score exceeds the threshold score, the domain name may be malicious or "typosquatted."

Various potential use cases of the disclosed embodiments are described below. It is understood that these use cases are provided by way of example only and are not limiting of the present disclosure.

One potential implementation may be to screen emails and identify, in real time, email addresses, links, etc. that may be similar to legitimate domain names but are actually malicious or fake. In one example, this may be performed by the email server that screens emails in real time as they arrive and sends a notification to the user's client device indicating that a particular domain is potentially malicious. In another example, the screening may occur on the client device. The client device side screening may be conducted by, for example, a plugin for an email software (e.g., Microsoft outlook), a browser extension (e.g., for a browser-based email client), or a separate application. The software may be executed to implement one or more of the processes described herein, such as processes 200, 600, and 700. For example, domain names may be detected within incoming emails, including but not limited to "from" email addresses, carbon copied email addresses, links in the body of the email, URLs in the body of the email, or others. A preexisting list of legitimate reference names may also be identified or accessed.

Upon identifying the domains in the email, the domains may be processed using a language processing protocol. Scores for the processed domain names may then be generated by comparing the processed domains to the list of reference names, as described herein. Based on the scores, one or more of the domain names may be determined to be sufficiently similar to one or more of the reference names such that it is likely to be "typosquatted" (e.g., misleading or malicious). Accordingly, a security action may be taken to, for example, prevent the party receiving the email from replying to it or sending another email to an address associated with the "typosquatted" domain. As another example, the user may be warned about the potential maliciousness of the link in the email through a flag or other notification.

Another possible implementation is to facilitate batch analysis of domain in a fast and efficient manner. For example, a legitimate domain holder may confront problems from malicious actors on the internet who seek to take advantage of the legitimate domain name by registering a domain that include a very slight variation of the legitimate. The malicious user may launch attacks on unsuspecting internet users by taking advantage of typographical errors or users who overlook the minor variation in the domain name. The legitimate domain holder can implement disclosed embodiments to batch analyze many domain names quickly to determine if any of the domains are similar to his own legitimate one to present such a "typosquatting" potential. Disclosed embodiments may permit the user to retrieve a list of newly registered domains and analyze them all very quickly. For example, each domain in the list may be processed using a language processing protocol and compare to the legitimate domain name of the user. Using one or more of the methods described herein, a score may be generated for each domain name on the list. The user may then receive a report or notification of any of the domains on the list that exceed a threshold score. The threshold may be set such that it indicates sufficient similarity between the domain name and the reference name. Sufficient similarity may indicate that the domain name is illegitimate or "typosquatted." Thus, upon receiving the report of potentially "typosquatted" domains, the user could review the domains and take appropriate action to remove their registration or otherwise prevent the unsuspecting internet user from accessing them. By implementing such efficient batch analysis the legitimate domain holder may be able to prevent others from being attacked with domain names similar to his.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for analyzing domain names to detect potential security risks, the operations comprising:
    identifying a reference name;
    identifying a domain name;
    performing a real time analysis of the domain name, the analysis comprising:
        applying a language processing protocol to the domain name, wherein the domain name is an input to the application of the language processing protocol and the language processing protocol is a word embedding algorithm for separating the domain name into two or more subparts, wherein each of the two or more subparts comprises at least one character;
        calculating, for each of the at least two subparts, a first score using term frequency inverse document frequency;
        creating vectors associated with the word embedding algorithm for the domain name based on the first score for each of the at least two subparts;
        generating, based on the domain name, the vectors, the first score, and the application of the language processing protocol, a second score indicating a similarity between the domain name and the reference name;
        accessing a similarity threshold; and
        comparing the second score with the similarity threshold;
    determining, based on the comparison, that the second score exceeds the threshold; and
    performing, based on the determination, a security action corresponding to the domain name, the security action comprising at least one of:
        sending an alert indicating the domain name is potentially malicious;
        displaying a visual notation associated with the domain name;
        blocking access to the domain name;
        preventing an email from being sent to an email address associated with the domain name; or
        preventing an email from being received from an email address associated with the domain name.

2. The non-transitory computer readable medium of claim 1, wherein identifying a domain name comprises identifying a list having a plurality of domain names.

3. The non-transitory computer readable medium of claim 1, wherein the domain name is identified from a list comprising a plurality of newly created domain names.

4. The non-transitory computer readable medium of claim 1, wherein the domain name is identified from a website uniform resource locator (URL).

5. The non-transitory computer readable medium of claim 1, wherein the domain name is identified from a link in a website.

6. The non-transitory computer readable medium of claim 1, wherein the domain name is identified from a link in an email.

7. The non-transitory computer readable medium of claim 1, wherein the domain name is associated with an email address.

8. The non-transitory computer readable medium, wherein the second score is a confidence score indicating a level of variation of the domain name from the reference name.

9. A computer implemented method for analyzing character elements to detect potential security risks, the method comprising:
 identifying a reference name;
 identifying a character element;
 performing a real time analysis of the character element, the analysis comprising:
  applying a language processing protocol to the character element wherein the character element is an input to the application of the language processing protocol and the language processing protocol is a word embedding algorithm comprising separating the character element into two or more subparts, wherein each of the two or more subparts comprises at least one character;
  calculating, for each of the at least two subparts, a first score using term frequency inverse document frequency;
  creating vectors associated with the word embedding algorithm for the character element based on the first score of each of the at least two subparts;
  generating, based on the character element, the vectors, the first score, and the application of the language processing protocol, a second score indicating a similarity between the character element and the reference name;
  accessing a similarity threshold; and
  comparing the second score with the similarity threshold;
  determining, based on the comparison, that the second score exceeds the threshold; and
  performing, based on the determination, a security action corresponding to the character element.

10. The computer-implemented method of claim 9, wherein the second score is based on a calculated similarity measurement between the character element and the reference name.

11. The computer-implemented method of claim 10, wherein the similarity measurement comprises a calculated distance between the character element and the reference name.

12. The computer-implemented method of claim 9, wherein the security action comprises preventing a download of a file associated with the character element.

13. The computer-implemented method of claim 9, wherein the second score is generated using a machine learning algorithm.

14. The computer-implemented method of claim 13, wherein the machine learning algorithm comprises at least one of:
 a term-frequency based algorithm;
 a cosine similarity algorithm; or
 a k-nearest neighbors algorithm.

15. The computer-implemented algorithm of claim 9, wherein the real-time analysis is performed by a client device.

16. The computer-implemented method of claim 9, wherein the real-time analysis is performed by a server.

17. The computer-implemented method of claim 16, wherein identifying a character element comprises receiving an indication of the character element from a client device.

18. The computer-implemented method of claim 17, wherein the security response comprises sending an alert to the client device indicating the character element is potentially malicious.

* * * * *